(12) United States Patent
Gabelgaard

(10) Patent No.: US 8,585,006 B2
(45) Date of Patent: Nov. 19, 2013

(54) FLEXIBLE VALVE

(75) Inventor: Hans Christian Gabelgaard, Vordingborg (DK)

(73) Assignee: Semvac A/S, Odense S (DK)

( * ) Notice: Subject to any disclaimer, the term of this patent is extended or adjusted under 35 U.S.C. 154(b) by 510 days.

(21) Appl. No.: 11/910,796

(22) PCT Filed: Apr. 4, 2006

(86) PCT No.: PCT/IB2006/051029
§ 371 (c)(1), (2), (4) Date: Oct. 5, 2007

(87) PCT Pub. No.: WO2006/106485
PCT Pub. Date: Oct. 12, 2006

(65) Prior Publication Data
US 2009/0121166 A1    May 14, 2009

(30) Foreign Application Priority Data
Apr. 6, 2005    (DK) .................................. 2005 00487

(51) Int. Cl.
*F16K 7/04*    (2006.01)
(52) U.S. Cl.
USPC ................................................. 251/7; 251/5
(58) Field of Classification Search
USPC ................. 137/67; 251/4, 7, 61, 61.1, 5, 8
See application file for complete search history.

(56) References Cited

U.S. PATENT DOCUMENTS

| | | | |
|---|---|---|---|
| 2,770,439 A | 11/1956 | Stafford et al. ............... 249/60 |
| 3,197,173 A * | 7/1965 | Taubenheim ..................... 251/6 |
| 3,204,919 A | 9/1965 | Tripoli et al. ..................... 251/8 |
| 3,278,153 A | 10/1966 | Dallas ............................... 251/7 |
| 3,482,267 A * | 12/1969 | Liljendahl ........................ 251/5 |
| 3,498,316 A * | 3/1970 | Humphrey et al. .............. 251/7 |
| 3,695,576 A * | 10/1972 | Kane et al. ....................... 251/5 |
| 3,770,023 A | 11/1973 | Rink ............................. 138/121 |
| 3,826,461 A | 7/1974 | Summerfield et al. .......... 251/7 |
| 4,372,528 A * | 2/1983 | Raftis .............................. 251/4 |
| 4,783,859 A | 11/1988 | Rozenblatt et al. ............ 4/316 |
| 5,207,409 A * | 5/1993 | Riikonen ......................... 251/7 |
| 5,441,231 A * | 8/1995 | Payne et al. ..................... 251/5 |
| 5,983,414 A * | 11/1999 | Lindroos et al. ............... 4/435 |
| 6,095,492 A * | 8/2000 | Rubitschung ................ 251/212 |

(Continued)

FOREIGN PATENT DOCUMENTS

| | | |
|---|---|---|
| FR | 1.056.327 | 2/1952 |
| JP | 61286673 | 12/1986 |

*Primary Examiner* — John K Fristoe, Jr.
*Assistant Examiner* — Andrew J Rost
(74) *Attorney, Agent, or Firm* — Winston & Strawn LLP

(57) ABSTRACT

A flexible valve that includes a flexible sleeve inserted in a fluid line and made with two circumferential folds, two opposite slides located between the folds displaceably in phase opposition and extending crosswise of the sleeve, and a mechanism for displacing the slides between open an closed positions. A sleeve section connects the two folds, and a closing section made on the sleeve section is supported by the slides. The flexible valve according to the invention has a longer service life and a shorter installation length than hitherto known. It is suitable for use as stop valve in the drain line from a toilet in a railway carriage, in which it can be continuously kept in the closed position without applying energy, and it is furthermore safeguarded against impurities getting out into and fouling the surrounding environment in the railway carriage.

8 Claims, 5 Drawing Sheets

(56) References Cited

U.S. PATENT DOCUMENTS

| | | | |
|---|---|---|---|
| 6,102,361 A | 8/2000 | Riikonen | 251/5 |
| 6,394,411 B1 * | 5/2002 | Hafner et al. | 251/7 |
| 6,575,425 B1 * | 6/2003 | Betz | 251/5 |
| 6,755,389 B2 * | 6/2004 | Igarashi | 251/5 |
| 6,948,696 B1 * | 9/2005 | Aanonsen et al. | 251/4 |
| 2003/0116731 A1 * | 6/2003 | Hartley | 251/7 |

\* cited by examiner

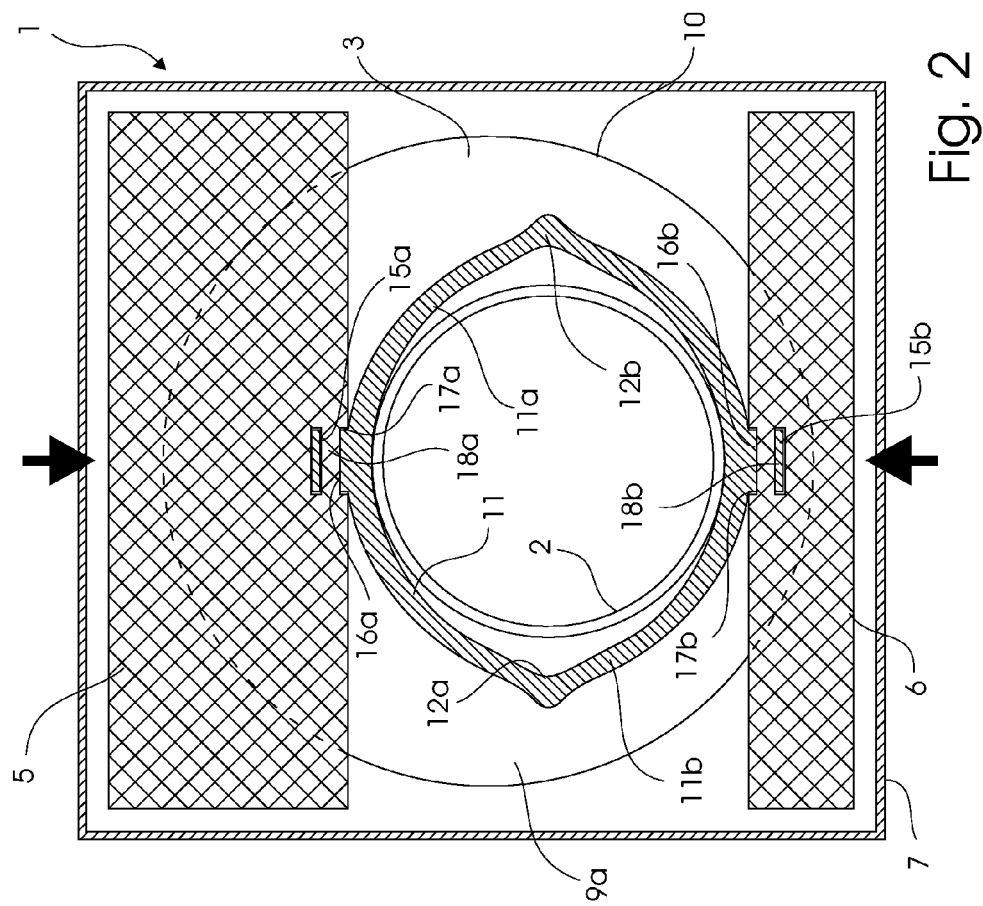
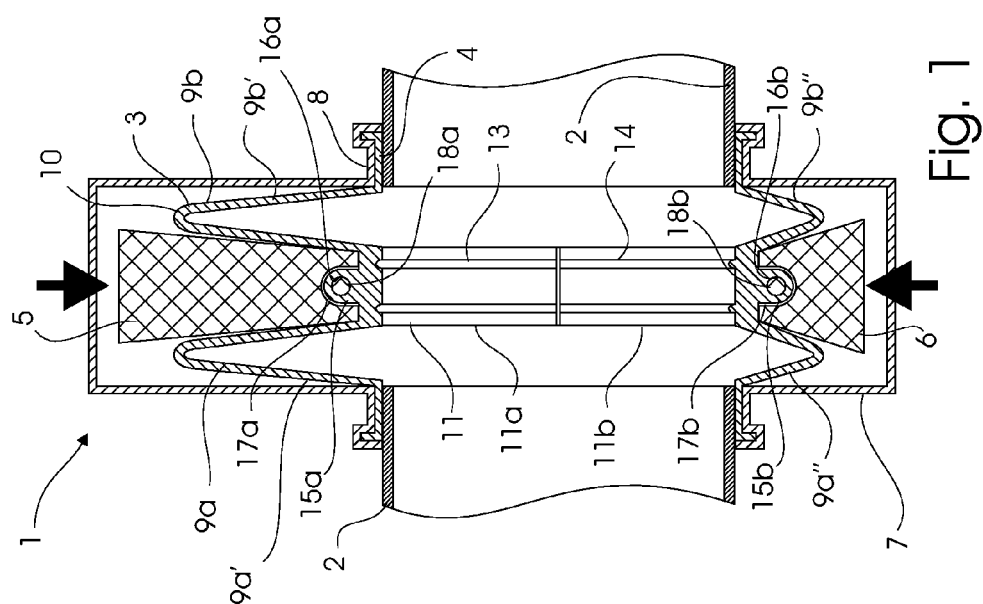

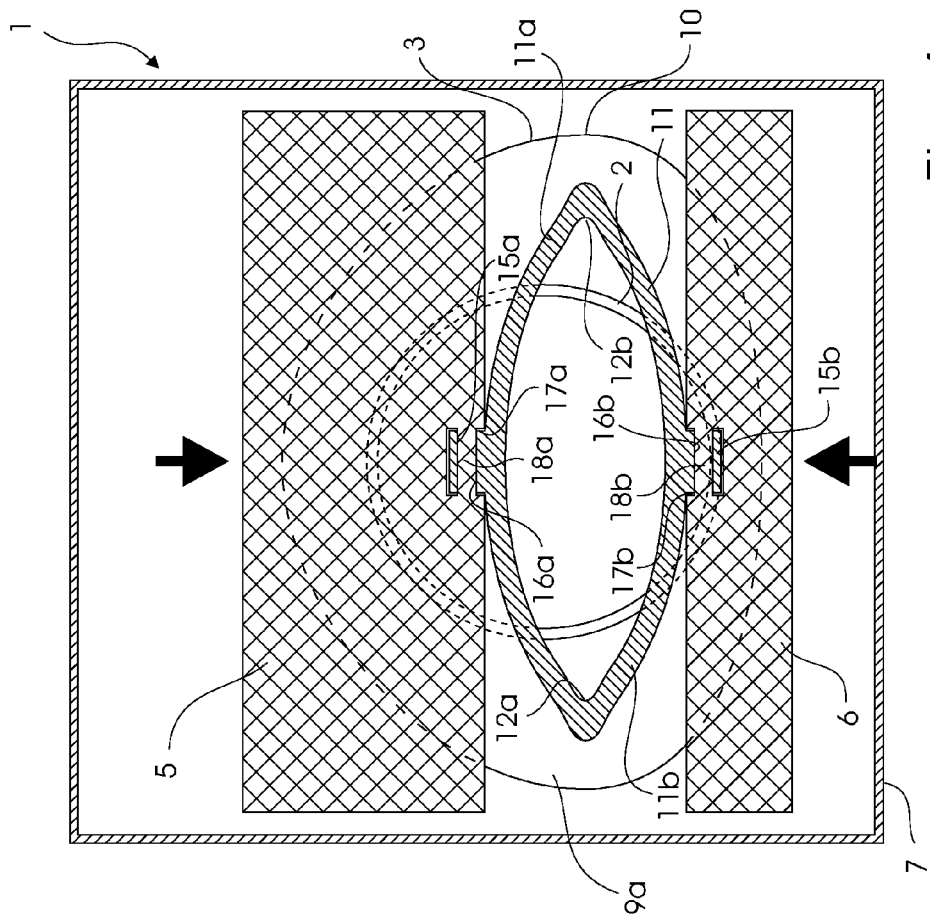
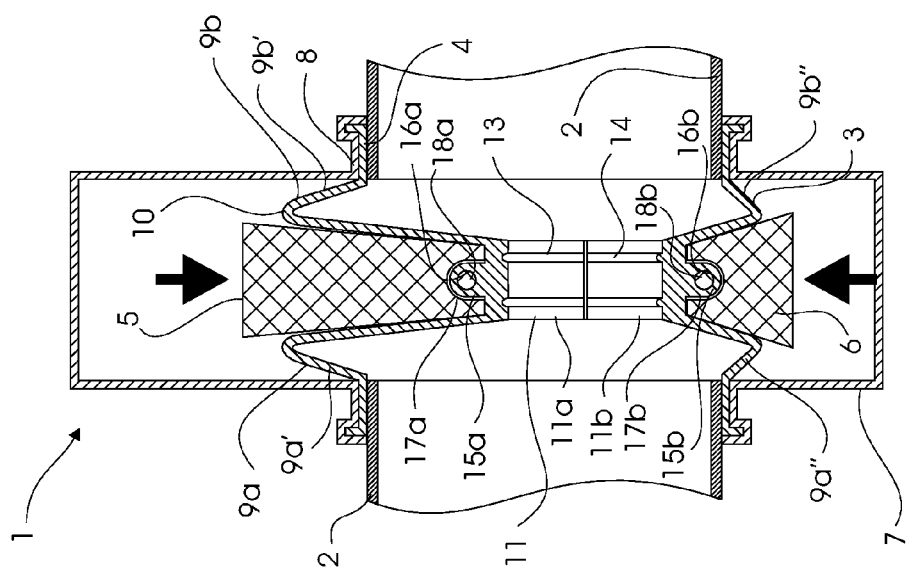

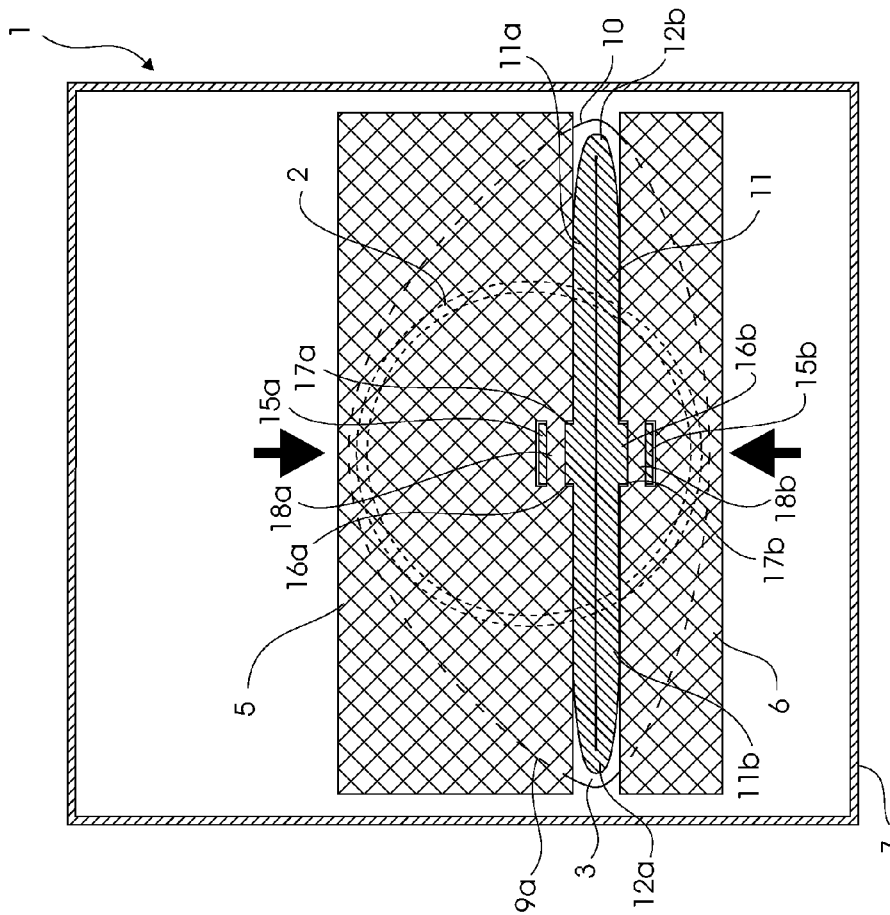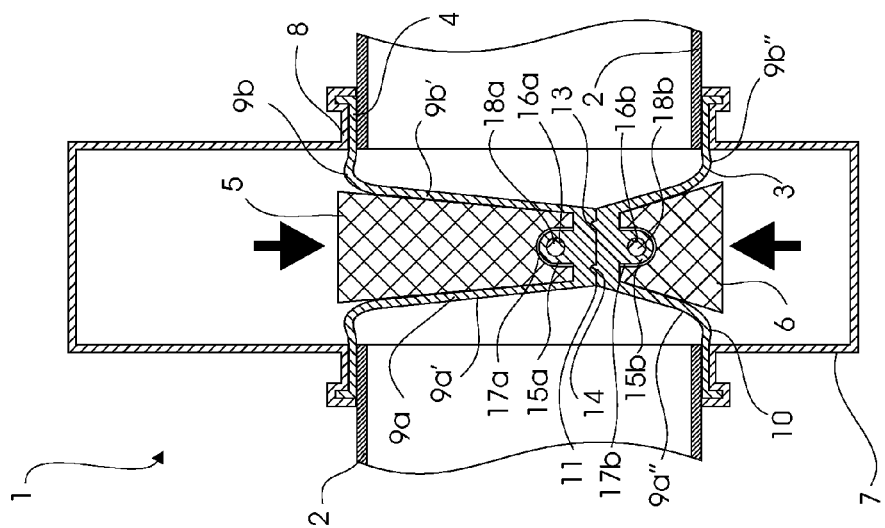

FLEXIBLE VALVE

The invention relates to a valve for opening and closing the flow in a fluid line and comprising a flexible sleeve inserted in a space between two free line ends in the fluid line, two transverse folds made at mutual distance on the sleeve and directly or indirectly connected to each their line end of the two line ends, a sleeve section connecting the two folds, a closing section made on the sleeve section, two opposite slides engaging each their side of the closing section, and means for displacing the slides between a position in which they cause the closing section to close, and a second position in which the closing section is kept open.

The invention furthermore relates to a method for manufacturing the valve and use of this valve.

Purely mechanical valves are largely used as stop valves in fluid lines. As an example mention can be made of slide valves in the drain line of a toilet, where a slide valve advantageously would be able to prevent a possible pressure difference across the valve from sending flushing back at the risk of hitting the person using the toilet.

However, a mechanical slide valve is not very reliable for such an application, as scale and urine deposits are deposited on it. Furthermore, it cannot withstand functioning in the highly corroding environment in a toilet drain line very well. Therefore, valves of this type have a very limited service life.

These disadvantages are overcome by instead using valves with flexible sleeves of a material that can withstand the environment in a toilet drain line and that advantageously frees itself of deposits as the wall of the sleeve is deformed every time the valve is opened and closed.

A flexible sleeve for a valve is in general made of a corrosion-resistant, natural or synthetic rubber that however is a material that is aged quite quickly by continuously being subjected to internal stresses, as e.g. is the case if the material of the sleeve is deformed in the closed state of the valve.

The sleeve therefore must be replaced frequently but such a replacement is expensive and especially so when it has to take place under difficult conditions.

The problem has been sought solved by making the valve with a relatively large installation length. In many cases, this is however not possible due to lack of space. Furthermore, the sleeve will still be loaded by harmful internal stresses.

U.S. Pat. No. 4,783,859 describes a valve for opening and closing a drain line from a toilet. The flexible sleeve of the valve is built into a housing, and a section of the sleeve can be opened and closed by two opposite knives that can be pushed back and forth by activation of a closing mechanism extending across the sleeve.

U.S. Pat. No. 3,826,461 describes another valve that functions with a flexible sleeve. In this case, the sleeve is made with folds located at a distance from each other, and it is inserted in a valve housing with semicircular recesses, seen in axial section, for supporting the folds in the open state of the valve. A displaceable piston working crosswise of the valve housing serves for pinching the sleeve between the end faces of the piston and the opposite inner side of the valve housing. During this, the folds are unfolded whereby the advantage is obtained in that the material is not strained very much in the longitudinal direction of the sleeve. However, the material is still stretched and strained in the longitudinal direction of the sleeve. Therefore, these sleeves do not attain a very long service life either, and they are furthermore difficult to replace.

A similar valve is known from EP Patent No. 0 574 128. In this case, two transverse round bars are used for closing the sleeve in the middle in phase opposition. Thereby, the harmful stresses in the sleeve are somewhat reduced.

A common feature of the above known sleeve valves is that they have a large installation length in both the longitudinal and transverse direction of the sleeve. The large space requirement of the valves means that they are not suited for mounting in a replaceable toilet module with restricted space.

Replaceable toilet modules are however widely used in for example airplanes and railway carriages, where the practice is to replace a module as a whole by a new one if only one module component, for example a valve, should fail.

Another disadvantage is that the known sleeve valves have a relatively short service life due to the rather large strains on the sleeves when they are closed, as is the case most of the time.

Furthermore, the valves do not close with the often required certainty, and membrane rupture may furthermore result in a flushing from a vacuum toilet being more or less returned.

The above indicated shortcomings and disadvantages of the known sleeve valves are overcome according to the invention by in a first aspect of the invention providing a valve of the kind mentioned in the opening paragraph, which takes up less space than hitherto known, in a second aspect of the invention providing a valve of the kind mentioned in the opening paragraph, which has a longer service life than hitherto known, in a third aspect of the invention providing a valve of the kind mentioned in the opening paragraph, which is less likely to develop a leak in closed state than hitherto known, in a fourth aspect of the invention providing a valve of the kind mentioned in the opening paragraph, which is safeguarded against a difference pressure across the valve being able to return the fluid in the fluid line, in a fifth aspect of the invention providing a valve of the kind mentioned in the opening paragraph, which is safeguarded against fluid escaping the valve leaks out into the surrounding environment, in a sixth aspect of the invention providing a valve of the kind mentioned in the opening paragraph, which is arranged to be kept in closed position without use of power, in a seventh aspect of the invention providing a valve of the kind mentioned in the opening paragraph for use in a drain line between a toilet and a vacuum tank, in an eight aspect of the invention providing a method of the kind mentioned in the opening paragraph for manufacturing a flexible sleeve for a valve, the method being arranged to ensure that the material of the sleeve is loaded by less stress that hitherto known in closed state.

The novel and unique feature according to the invention, whereby this is achieved, is the fact that the closing section is made up of at least the main part of the sleeve section and is formed as two strips passing into each other in opposite transitions, and that the spacing between the transitions is larger than the diameter of the fluid line in the open state of the valve.

By flexible is meant in this case that the material can be deformed and is resilient.

Flexible sleeves for valves are generally made of a material such as e.g. natural rubber or synthetic rubber which is flexible enough to allow the deformations which the sleeve is subjected to when it is opened and closed; an operation which normally is repeated many times during the service life of the sleeve.

However, such a material ages relatively quickly when it continuously is in strained state. This is e.g. the case of valves that are used in drain lines for a vacuum toilet and that normally are closed most of the time.

The opposite sides on the two strips of the flexible sleeve serve as valve seats that are in close contact with each other in the closed position of the valve. The relatively modest surface pressure generated during this only generates strains to an insignificant extent in the material as opposed to known valves of this type which function with slides in form of mandrel, round bars, or knives that subject the material to harmful internal stresses that reduce the service life of the respective sleeves considerably.

When the valve is opened, the two strips and their surroundings are bent as beams supporting each other at the transitions of the strips. However, the relatively large spacing between these transitions advantageously has the effect that the deflection of the strips will be relatively small, and that the thereby generated inner stresses in the material will be correspondingly small. The sleeves according to the invention can therefore attain a long service life.

According to the invention, the wall of the strips can be thicker than the wall of the folds, whereby the advantage is obtained in that the strips will be tough and can be kept closed even if a foreign object may become caught between the two strips.

During use, for example the folds of the sleeve can rupture so that the valve develops a leak resulting in possible damages. This is especially the case when the valve is used in a drain line for a vacuum toilet, where a possible pressure difference across the valve then would be able to send a flushing back at the risk of hitting the person using the toilet even if the valve is closed.

The plate shaped slides, which are located between the folds during this according to the invention, will however in themselves form a barrier that could prevent or at least significantly reduce the possible negative effects of such a leak.

By building the sleeve into a housing according to the invention, the additional insurance is obtained against a leak in the sleeve polluting the environment as the housing would catch fluid and accompanying impurities that might pass through the leak.

When the valve is used as valve in the drain line from a toilet, it would be an advantage if the lower part, seen in mounted state, of the folds are lower than the upper part, as impurities then are not deposited so easily in the sleeve which furthermore easily can be purged.

In e.g. airplanes and railway carriages toilet modules with integrated valves are normally used. The valve according to the invention is suitable for mounting in such modules due to the relatively small space that they occupy in the modules in which the space is limited.

A short built-in length for use in a line in a replaceable toilet module is obtained according to the invention if the folds of the sleeve are relatively narrow and high.

In one embodiment the folds, seen in axial section, can be mainly shaped as a V with an apex angle which is in the interval between 5° and 30°, preferably between 10° and 20°.

In a second embodiment the sides of the folds can be located close to each other and close to either side in the housing. Thereby, the valve obtains an optimum short installation length.

Conventional sleeve valves also have an unfavourable large extent crosswise of the sleeve. By using articulations to displace the slides and a hydraulic or pneumatic cylinder extending mainly parallel to a plane including the transitions of the strips to activate the two articulations, the valve according to the invention obtains a far smaller extent than conventionally in the transverse direction of the sleeve.

According to the invention the articulation can furthermore be made as a toggle mechanism which is self-locking in the closed position. Thereby, the advantage is obtained in that the valve continuously can be kept in the closed position without use of power.

The sleeve is normally moulded in one piece of one of the above flexible materials. If the sleeve is moulded in an only partly open state, the stresses in the sleeve material will be very small when the valve is closed.

Alternatively, the sleeve can be moulded in two parts and then joined along their horizontal end parts, whereby the material of the sleeve is largely kept free of stresses in closed state.

The invention will be explained in greater details below, describing only exemplary embodiments with reference to the drawing, in which FIG. 1 is an axial sectional view through a valve according to the invention in open state;

FIG. 2 is a cross-sectional view of the valve in FIG. 1;

FIG. 3 is an axial sectional view through the valve in FIG. 1 in partly closed state;

FIG. 4 is a cross-sectional view of the valve in FIG. 3;

FIG. 5 is an axial sectional view through the valve in FIG. 1 in closed state;

FIG. 6 is a cross-sectional view of the valve in FIG. 5;

Figure 7:
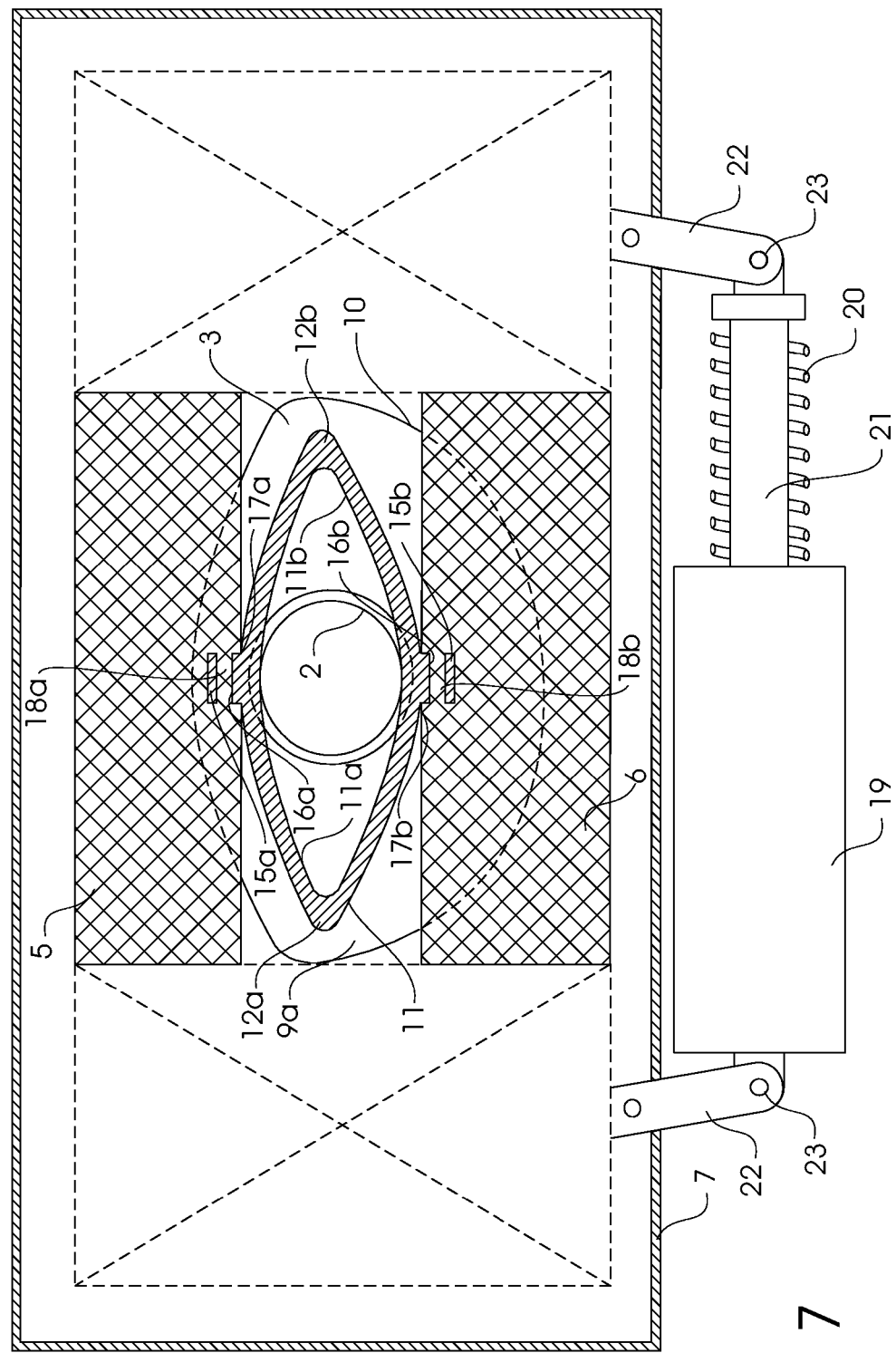
FIG. 7 is an axial sectional view of a second embodiment of a valve according to the invention in open state.

In the following, it is assumed that the valve 1 according to the invention in FIGS. 1-6 is mounted in a drain line 2 from a toilet (not shown) in a replaceable toilet module (not shown). The space available in such a module is limited, and it is therefore important that the valve has a short built-in length and a small extent in transverse direction so that the valve can fit in the module.

The valve comprises a sleeve 3 closely connected to the drain line 2 with pipe connections 4, and upper and lower slides 5 and 6 displaceable back and forth in phase opposition.

The sleeve and the slides are surrounded by a closed housing 7 closely connected to the pipe connections 4 of the sleeve by means of other pipe connections 8.

The sleeve is made with two circumferential folds $9a$ and $9b$ with upper parts $9a'$ and $9b'$ and lower parts $9a''$ and $9b''$. Seen in axial sectional view, the folds are, in this case, shaped mainly as a V with an apex angle which is in the interval between 5° and 30°, preferably between 10° and 20°, whereby the valve obtains such a short installation length that it e.g. can be mounted in a toilet module for an airplane or a railway carriage.

The lower fold parts $9a''$ and $9b''$ are lower than the upper fold parts $9a'$ and $9b'$. This results in the advantage that impurities from flushing of the toilet are not likely to be deposited in the lower fold parts which furthermore also are relatively easy to purge. The periphery of the folds is designated by the reference number 10.

The folds $9a$ and $9b$ are connected to a closing section 11 comprising an upper strip $11a$ and a lower strip $11b$ that pass into each other at the ends in tapered transition zone $12a$ and $12b$.

Two grooves 13 are made in the inner side of the upper strip $11a$ and two ribs 14 are made on the inside of the lower strip $11b$, said ribs fitting in the grooves 13 when the closing section is pinched by the slides 5 and 6. The thus cooperating grooves and ribs 13 and 14 contribute effectively to ensure the tightness of the sleeve in closed state and simultaneously guide the lower and upper strips $11a,b$ axially in relation to each other.

The two strips 11a,b of the closing section are furthermore made with a relatively large thickness having the effect that, in connection with selecting a flexible material with suitable softness, the closing section 11 can be pinched tightly around a foreign object that might get caught between its two strips 11a,b when the valve closes, that is to say that the valve still is tightly sealed in the closed state despite the presence of the foreign object.

The slides 5 and 6 are made as plates that at least mainly fill the space between the two folds 9a,b, whereby the slides keep the sleeve 3 in position. The plate-shaped slides furthermore partly or completely seal a leak that might have formed in the wall of the folds.

Despite the above measures, it is still possible that the valve might become leak. However, this does not result in the surrounding environment being polluted by ejected impurities which instead are collected in the closed housing 7 surrounding the valve.

In closed state, the plate-shaped slides form in themselves a barrier in the drain line between the toilet and a possible pressure source, and they thereby effectively prevent that a flushing is returned to foul the person using the toilet. Even if the material of the sleeve becomes leak, the barrier formed by the plate-shaped slides will still be able to prevent or at least significantly reduce spraying through the leak.

The upper strip 11a of the closing section 11 is in a central area formed with an upper eye 15a having a through-going cross hole 16a while the lower strip 11b is made with a lower eye 15b having a through-going cross hole 16a.

The upper eye 15a extends into a lower recess 17a made in the upper slide 5 which is also made with a small rod 18a extending through the cross hole 16a in the upper eye 15a on the upper strip 11a of the closing section 11 in mounted state.

The lower eye 15b extends into an upper recess 17b made in the lower slide 6 which is also made with a small rod 18b extending through the cross hole 16b in the lower eye 15b on the lower strip 11b of the closing section 11 in mounted state.

The valve is opened and closed by displacing the slides 5 and 6 up and down, respectively, in phase opposition but preferably at different rates so that they will pinch the closing sections simultaneously from either side.

According to the invention, the slides are activated by an articulation (not shown) which can be formed as a toggle mechanism (not shown) which is self-locking in closed position. In the latter case, the valve can therefore be closed continuously without applying energy.

Within the scope of the invention any other suitable means for activating the slides can however also be used.

In FIGS. 1 and 2, the valve 1 is in open state, in which the circumference 10 of the folds 9a,b of the sleeve 3 is the largest, and the folds include enough material to allow the closing section 11 of the sleeve to be pinched without thereby stretching and straining the material of the folds significantly.

Upon closing of the valve, the slides 5 and 6 are pushed in the direction shown by the arrows in towards each other by activating the above-mentioned articulation by means of a suitable drive mechanism (not shown).

In FIGS. 3 and 4, the sleeve has reached a intermediate state. According to the invention the sleeve is moulded in this state, in which it therefore is free of strain.

The slides 5 and 6 are then pushed further in towards each other in the direction shown by the arrows until they ultimately have pinched the closing section completely together in FIGS. 5 and 6 and thereby closed the valve. In this state a significant part of the material of the folds is straighten out of the folds which now have the smallest circumference with the asymmetrical shape shown in FIG. 6.

If the articulation is a toggle mechanism, the valve can remain in the closed position shown in FIGS. 5 and 6 without applying power until the drive mechanism makes the toggle mechanism open the valve.

A valve for a toilet is normally closed most of the time. It is therefore important that the sleeve is kept free of stresses in closed state to the greatest extent possible, as the material of which such flexible sleeves are made ages relatively quickly in stressed state resulting in a relatively short service life of the sleeve.

According to the invention, the folds of the sleeve extend freely between the connections to the drain line and the closing section. They can therefore freely change shape when the sleeve is closed, whereby the significant advantage is obtained in that the folds in closed state automatically will assume the shape, in which they are strained the least possible. The sleeve according to the invention thereby attains a long service life.

In the intermediate state shown in FIGS. 3 and 4, the sleeve is not subjected to stresses, as mentioned. Furthermore, its closing section 11 is already partly closed, whereas its strips 11a,b at the ends pass into each other in transition zones 12a,b. The closing section is therefore only affected by insignificant stresses when pinched from the partly closed state in FIGS. 3 and 4 to the completely closed state in FIGS. 5 and 6.

The valve is opened by drawing the slides 5 and 6 apart by means of the drive mechanism and the articulation, whereby the sleeve will try to return to the original moulded state in FIGS. 4 and 5 by itself.

Due to the engagement between the cross holes 16a,b in eyes 15a,b in strips 15a,b of closing section 11 and the rods 18a,b in recesses 17a,b in slides 5 and 6, these slides now draw the strips 15a,b of the closing section 11 along in opposite direction from the moulded, intermediate state in FIGS. 3 and 4 to the open state in FIGS. 1 and 2.

Figure 8:
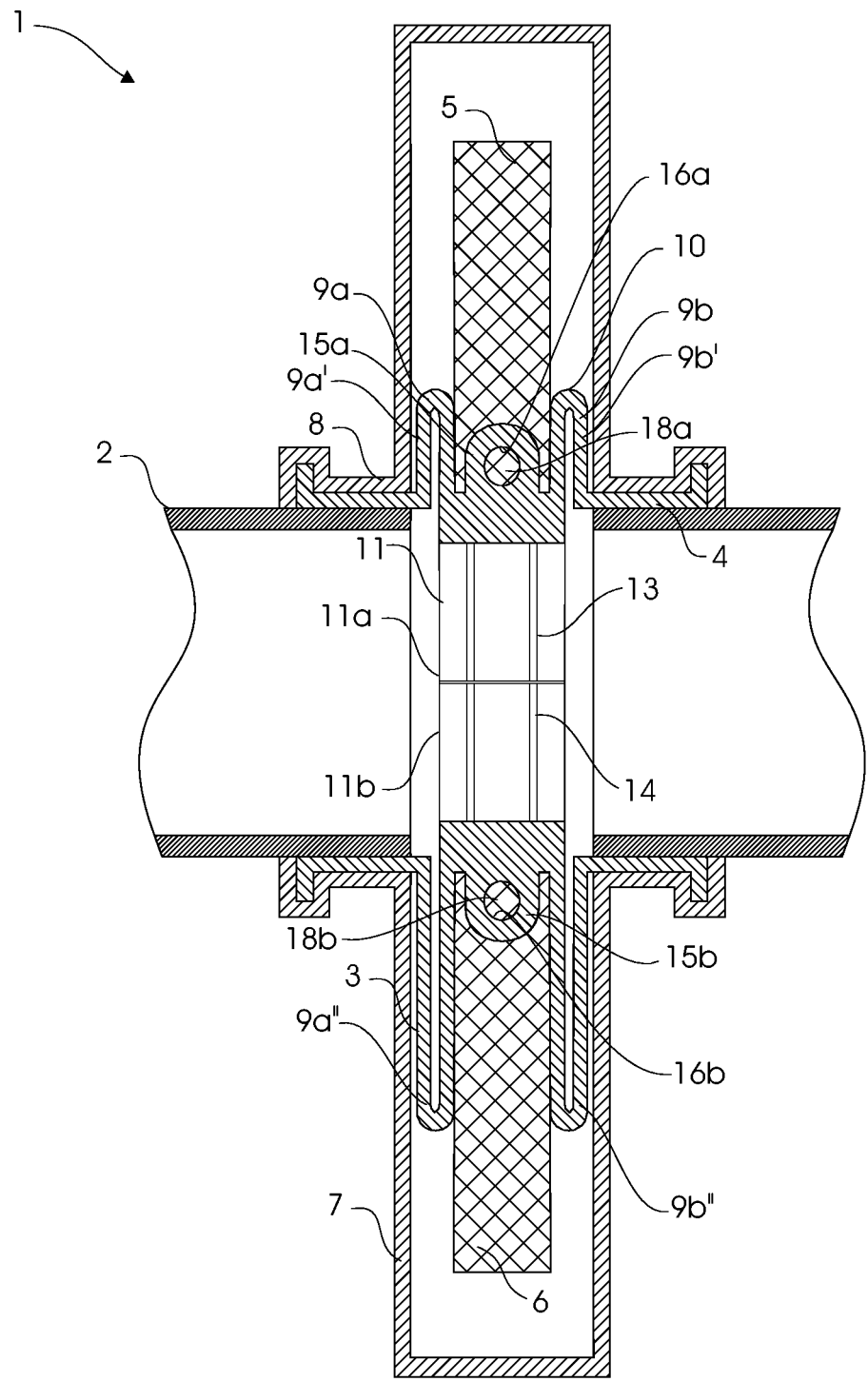
FIG. 8 is a cross-sectional view of the valve in FIG. 7.

FIGS. 7 and 8 show a second embodiment of a valve according to the invention. This embodiment mainly corresponds to the first embodiment in FIGS. 1-6. Like parts are therefore similarly referenced.

In this case, the folds are however located close next to each other and close to two of the opposite sides of the housing 7, whereby the valve obtains an optimum, short, axial installation length.

Upon opening and closing of the sleeve, its material is deformed, whereby harmful internal stresses are generated in the material. The deformations and accompanying stresses are however smaller than the ones upon opening and closing of the first embodiment in FIGS. 1-6.

This is essentially due to the fact that the folds 9a,b of the sleeve 3 are relatively low and that the spacing between the transition zones 12a,b between the strips 15a,b of the closing section 11 is relatively large.

The low height of the folds means that the two opposite parts of the sleeve essentially will functions as beams, and the large spacing between the transition zones means that the beams need not be bent much to form an opening of required size. Thereby, the significant advantage is obtained in that only relatively small internal stresses are generated in the sleeve upon opening and closing of the valve, and the sleeve will therefore attain a long service life.

The valve comprises a drive mechanism in form of a pneumatic drive cylinder 19 for opening and closing the valve. The cylinder extends in a direction parallel to the axial direction of the sleeve, whereby the valve also obtains an advantageously small extent in the transverse direction.

The drive cylinder can be double-acting or single-acting. In the case shown, the drive cylinder is single-acting. The return stroke is caused by means of a pressure spring 20 located on the piston rod 21 of the drive cylinder.

The valve furthermore comprises two articulations 22 located in the housing one either side of the transition zones 12a,b. These articulations do not form part of the present invention and are therefore only symbolically shown in FIGS. 7 and 8, that is to say as rectangles in dotted line.

The two articulations 22 are partly connected to the slides 5 and 6, partly to the drive cylinder 19 via links 23 pivotally mounted on the housing.

Upon activation of the drive cylinder 19 its piston rod 21 is taken in the direction shown by the arrow, whereby the links 23 make articulations 22 displace the slides 5 and 6 in phase opposition in such a way that they simultaneously bring each their strip of the two strips into open position.

Discontinuing the activation of the drive cylinder takes the piston rod 21 of the pressure spring 20 in the opposite direction, whereby the valve is closed. The valve is now kept closed without applying power until the drive cylinder is once again activated.

The invention is described above and in the drawing on the basis of a sleeve having two circumferential folds and two slides acting in phase opposition. Within the scope of the invention, sleeves having several folds and several slides acting in phase opposition in pairs can however be envisaged.

Within the scope of the invention, a valve having only one slide cooperating with an opposite stationary system can also be envisaged.

Within the scope of the invention other means than articulations and hydraulic or pneumatic cylinders for opening and closing the valve can furthermore be envisaged.

The invention claimed is:

1. A valve for opening and closing the flow in a fluid line, comprising:
    a flexible sleeve inserted in a space between two free line ends of the fluid line,
    two transverse folds made at mutual distance on the sleeve and directly or indirectly connected to each line end of the two line ends,
    a sleeve section connecting the two folds,
    a closing section made on the sleeve section and which includes at least a main part of the sleeve section and is made as two strips passing into each other in opposite transitions,
    two opposite slides each engaging their respective side of the closing section, and
    means for displacing the slides between a position in which they cause the closing section to close, and a second position in which the closing section is kept open,
    wherein the transitions are spaced by a distance that is larger than the diameter of the fluid line in the open state of the valve,
    the space between the two folds is formed as a circumferential groove defining a depth and a width, and
    the slides are formed as plates which at least, when the valve is closed, completely are filling the depth of the groove and at least partly the width of the groove.

2. The valve according to claim 1, wherein the wall of the strips has a thickness that is greater than that of the wall of the folds.

3. The valve according to claim 1, wherein each strip of the sleeve is made with an eye extending into a recess in the associated slide and that the associated slide includes a pin that can extend through this eye.

4. The valve according to claim 1, wherein the valve comprises a housing enclosing the sleeves and slides and each fold of the sleeve is located closely against either side of said housing.

5. The valve according to claim 1, wherein the means for displacing the slides comprises at least one hydraulic or pneumatic cylinder for activating one or more articulations located in the housing on either side of the transitions of the strips and is arranged to displace the slides in phase opposition in such a way that they simultaneously bring each their strip into the closed position, whereby the cylinder extends mainly parallel to a plane including the transitions of the strips.

6. In a method for manufacturing a pinch valve, the improvement wherein the valve is designed according to claim 1 and the sleeve is molded in a partly closed shape in which it is free of strain in order to extend the service life of the sleeve compared to molding of the sleeve in a position that conforms to a fully open or fully closed valve.

7. A valve for opening and closing the flow in a fluid line, comprising:
    a flexible sleeve inserted in a space between two free line ends of the fluid line;
    two transverse folds made at mutual distance on the sleeve and directly or indirectly connected to each line end of the two line ends, wherein each fold has an upper part higher than the opposite lower part such that impurities are not likely to be deposited in the lower part making the folds relatively easy to purge;
    a sleeve section connecting the two folds;
    a closing section made on the sleeve section and which includes at least a main part of the sleeve section and is made as two strips passing into each other in opposite transitions;
    two opposite slides each engaging their respective side of the closing section; and
    means for displacing the slides between a position in which they cause the closing section to close, and a second position in which the closing section is kept open;
    a housing enclosing the sleeve and the slides;
    wherein the transitions are spaced by a distance that is larger than the diameter of the fluid line in the open state of the valve and the slides are made as plates completely or partly filling the space between the two folds at least when the valve is closed; and
    wherein the fold upper part is larger than the fold lower part with the upper fold part located between one slide and the housing and the lower fold part located between the other slide and the housing.

8. In a method for manufacturing a pinch valve, the improvement wherein the valve is designed according to claim 7 and the sleeve is molded in a partly closed shape in which it is free of strain in order to extend the service life of the sleeve compared to molding of the sleeve in a position that conforms to a fully open or fully closed valve.

* * * * *

UNITED STATES PATENT AND TRADEMARK OFFICE
CERTIFICATE OF CORRECTION

| | | |
|---|---|---|
| PATENT NO. | : 8,585,006 B2 | Page 1 of 1 |
| APPLICATION NO. | : 11/910796 | |
| DATED | : November 19, 2013 | |
| INVENTOR(S) | : Gabelgaard | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 707 days.

Signed and Sealed this
Second Day of June, 2015

Michelle K. Lee
*Director of the United States Patent and Trademark Office*